(12) United States Patent
Shin et al.

(10) Patent No.: US 10,387,227 B2
(45) Date of Patent: Aug. 20, 2019

(54) METHOD AND ELECTRONIC APPARATUS FOR EXECUTING APPLICATION

(71) Applicant: SAMSUNG ELECTRONICS CO., LTD., Suwon-si (KR)

(72) Inventors: Seung-min Shin, Seoul (KR); Seung-won Kim, Seoul (KR); Je-youn Dong, Suwon-si (KR); Sung-pil Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/200,773

(22) Filed: Jul. 1, 2016

(65) Prior Publication Data

US 2017/0004027 A1 Jan. 5, 2017

(30) Foreign Application Priority Data

Jul. 2, 2015 (KR) ........................ 10-2015-0094931

(51) Int. Cl.
*G06F 9/54* (2006.01)
*H04L 29/08* (2006.01)
*G06F 12/0862* (2016.01)
*G06F 17/30* (2006.01)
*H04N 21/443* (2011.01)
*H04N 21/81* (2011.01)
*G06F 8/61* (2018.01)
*H04N 21/422* (2011.01)

(52) U.S. Cl.
CPC ............... *G06F 9/543* (2013.01); *G06F 8/61* (2013.01); *G06F 12/0862* (2013.01); *G06F 17/30* (2013.01); *H04L 67/141* (2013.01); *H04N 21/42203* (2013.01); *H04N 21/4433* (2013.01); *H04N 21/8173* (2013.01)

(58) Field of Classification Search
None
See application file for complete search history.

(56) References Cited

U.S. PATENT DOCUMENTS

| 7,376,681 B1 | 5/2008 | Todd et al. | |
| 2006/0080479 A1* | 4/2006 | Anjo | G06F 13/28 710/22 |
| 2007/0233677 A1* | 10/2007 | Facciorusso | G06Q 30/02 |
| 2008/0127131 A1 | 5/2008 | Gao et al. | |

(Continued)

FOREIGN PATENT DOCUMENTS

KR 1020140076272 A 6/2014

OTHER PUBLICATIONS

Communication dated Oct. 10, 2016, issued by the European Patent Office in counterpart European application No. 16175224.1.

*Primary Examiner* — Chat C Do
*Assistant Examiner* — William C Wood
(74) *Attorney, Agent, or Firm* — Sughrue Mion, PLLC

(57) ABSTRACT

A method for executing an application of a display apparatus is provided. The method includes: storing a first request list that includes items of data that an application requests from other applications; comparing the first request list with a second provision list that includes items of data provided from the other applications and acquiring data that corresponds to the items included in the first request list; and executing the application based on the acquired data.

19 Claims, 23 Drawing Sheets

(56) References Cited

U.S. PATENT DOCUMENTS

| | | | |
|---|---|---|---|
| 2009/0248476 A1* | 10/2009 | Trinh | G06Q 10/107 705/7.19 |
| 2010/0058326 A1* | 3/2010 | Dei | G06F 8/61 717/174 |
| 2011/0258654 A1* | 10/2011 | Lee | H04N 21/2362 725/1 |
| 2011/0265040 A1* | 10/2011 | Shin | G06F 3/0485 715/830 |
| 2012/0046996 A1 | 2/2012 | Shah et al. | |
| 2012/0239739 A1* | 9/2012 | Manglik | G06F 9/5077 709/203 |
| 2013/0041665 A1 | 2/2013 | Jang et al. | |
| 2013/0212502 A1 | 8/2013 | Ahn et al. | |

* cited by examiner

FIG. 3A

| APPLICATION | REQUEST LIST | PROVISION LIST | |
| --- | --- | --- | --- |
| | | PROVISION ITEM | ADDRESS |
| FIRST APPLICATION | – FIRST ITEM<br>– SECOND ITEM | – THIRD ITEM<br>– FOURTH ITEM | 0x000A1000<br>0x000A1100 |
| SECOND APPLICATION | – FIFTH ITEM | – FIRST ITEM<br>– SECOND ITEM | 0x000A2000<br>0x000A2100 |
| THIRD APPLICATION | – FOURTH ITEM | – FIFTH ITEM | 0x000A3000 |

FIRST REQUEST LIST (310)   SECOND PROVISION LIST (320)

FIG. 13A

| APPLICATION | REQUEST LIST | PROVISION LIST | | |
|---|---|---|---|---|
| | | PROVISION ITEM | ADDRESS | AUTHORIZATION INFORMATION |
| FIRST APPLICATION | – FIRST ITEM | – THIRD ITEM | 0x000A1000 | THIRD APPLICATION FOURTH APPLICATION |
| | – SECOND ITEM | – FOURTH ITEM | 0x000A1100 | FOURTH APPLICATION |
| SECOND APPLICATION | – FIFTH ITEM | – FIRST ITEM | 0x000A2000 | FIRST APPLICATION |
| | | – SECOND ITEM | 0x000A2100 | – |
| THIRD APPLICATION | – THIRD ITEM – FOURTH ITEM | – FIFTH ITEM | 0x000A3000 | SECOND APPLICATION |
| FOURTH APPLICATION | – THIRD ITEM – FOURTH ITEM | – SIXTH ITEM | 0x000A4000 | XTH APPLICATION |

FIRST REQUEST LIST (1310)

SECOND PROVISION LIST (1320)

METHOD AND ELECTRONIC APPARATUS FOR EXECUTING APPLICATION

CROSS-REFERENCE TO RELATED APPLICATION

This application claims priority from Korean Patent Application No. 10-2015-0094931, filed on Jul. 2, 2015, in the Korean Intellectual Property Office, the disclosure of which is incorporated herein in its entirety by reference.

BACKGROUND

1. Field

Exemplary embodiments relate to a method and electronic apparatus for executing an application.

2. Description of the Related Art

A display apparatus is an apparatus that has a function of displaying an image that a user may view. The user may view a broadcast through the display apparatus. The display apparatus displays a broadcast, which is selected by the user from a broadcast signal transmitted from a broadcasting station, on a display.

The digital broadcast refers to a broadcast whereby a digital image and a voice signal are transmitted. In comparison with an analog broadcast, the digital broadcast is robust with respect to external noise to reduce data loss, is appropriate for error correction, provides a high resolution, and provides a clear screen. The digital broadcast may also enable a bidirectional service variably from the analog broadcast.

Also, in addition to a digital broadcast function, recently provided smart televisions (TVs) are capable of driving various types of applications. Smart TVs provide various types of services to a user through various types of applications. Therefore, as needs of users of smart TVs increase, the number of applications driven by a smart TV and an amount of data processed by each of the applications have geometrically increased. As a result, efforts to control an amount of data processed by each of the applications are needed.

SUMMARY

Provided are a method and electronic apparatus for executing an application to enable other applications to use information processed in applications executed in the electronic apparatus so as to decrease a processing load of the electronic apparatus.

Additional aspects will be set forth in part in the description which follows and, in part, will be apparent from the description, or may be learned by practice of the presented exemplary embodiments.

According to an aspect of an exemplary embodiment, a method for executing an application by using an electronic apparatus, includes: storing a first request list including items of data that the application requests from other applications; comparing the first request list with a second provision list including items of data received from the other applications and acquiring data corresponding to the items included in the first request list; and executing the application based on the acquired data.

The first request list may be stored at a time when the application is installed.

The method may further include storing a first provision list including items of data that the application provides to the other applications.

The items included in the first request list and the items included in the first provision list may be preset by a developer or a provider of the application.

Data corresponding to each of the items of the first provision list may be generated when executing the application, and the first provision list may include address information indicating where the data corresponding to each of the items of the first provision list is stored.

The data generated when executing the application may be processed in a preset format.

Each of the items of the first provision list may store authorization information with respect to access by the other applications in the data corresponding to each of the items.

The acquiring of the data corresponding to the items included in the first request list may include accessing the data corresponding to each of the items included in the first request list based on the authorization information of the application stored according to the items included in the second provision list.

According to an aspect of another exemplary embodiment, a method for executing an application by using an electronic apparatus, includes: executing a first application; receiving a user command when executing the first application; acquiring request data for executing a job corresponding to the received user command from a data list received from a second application; and outputting an execution result of the job based on the acquired request data.

According to an aspect of another exemplary embodiment, an electronic apparatus includes: a memory configured to store a first request list including items of data that an application requests from other applications; and a processor configured to compare the first request list with a second provision list including items of data provided from the other applications and acquire data corresponding to the items included in the first request list and execute the application based on the acquired data.

The first request list may be stored in the memory at a time when the application is installed.

The memory may store a first provision list including items of data that the application provides to the other applications.

The items included in the first request list and the items included in the first provision list may be preset by a developer or a provider of the application.

Data corresponding to each of the items of the first provision list may be generated when executing the application, and the memory may store address information in which the data corresponding to each of the items of the first provision list is stored.

The processor may process the data generated when executing the application, in a preset format.

The processor may allocate authorization information, with respect to access by the other applications, to the data corresponding to each of the items of the first provision list.

The processor may acquire data corresponding to each of the items included in the first request list based on the allocated authorization information according to the items included in the second provision list.

According to an aspect of another exemplary embodiment, an electronic apparatus includes: a processor configured to execute a first application; and a user interface configured to receive a user command when executing the first application. The processor may acquire request data for performing a job corresponding to the user command from a data list provided from a second application and control outputting of a result of performing the job based on the acquired request data.

According to an aspect of another exemplary embodiment, a system for executing an application, includes: an electronic apparatus configured to receive an input for commanding execution of an application and transmit an identification value of the application to a server; and the server configured to compare a first request list including items of data that the application requests from other applications with a second provision list including items of data provided from the other applications to provide the electronic apparatus with data corresponding to the items included in the first request list. The electronic apparatus may execute the application based on the data acquired from the server.

BRIEF DESCRIPTION OF THE DRAWINGS

These and/or other aspects will become apparent and more readily appreciated from the following description of exemplary embodiments, taken in conjunction with the accompanying drawings in which:

FIG. 3A illustrates a first request list and a second provision list, according to an exemplary embodiment;

FIG. 13A illustrates a first request list and a second provision list, according to an exemplary embodiment;

DETAILED DESCRIPTION

Figure 1:
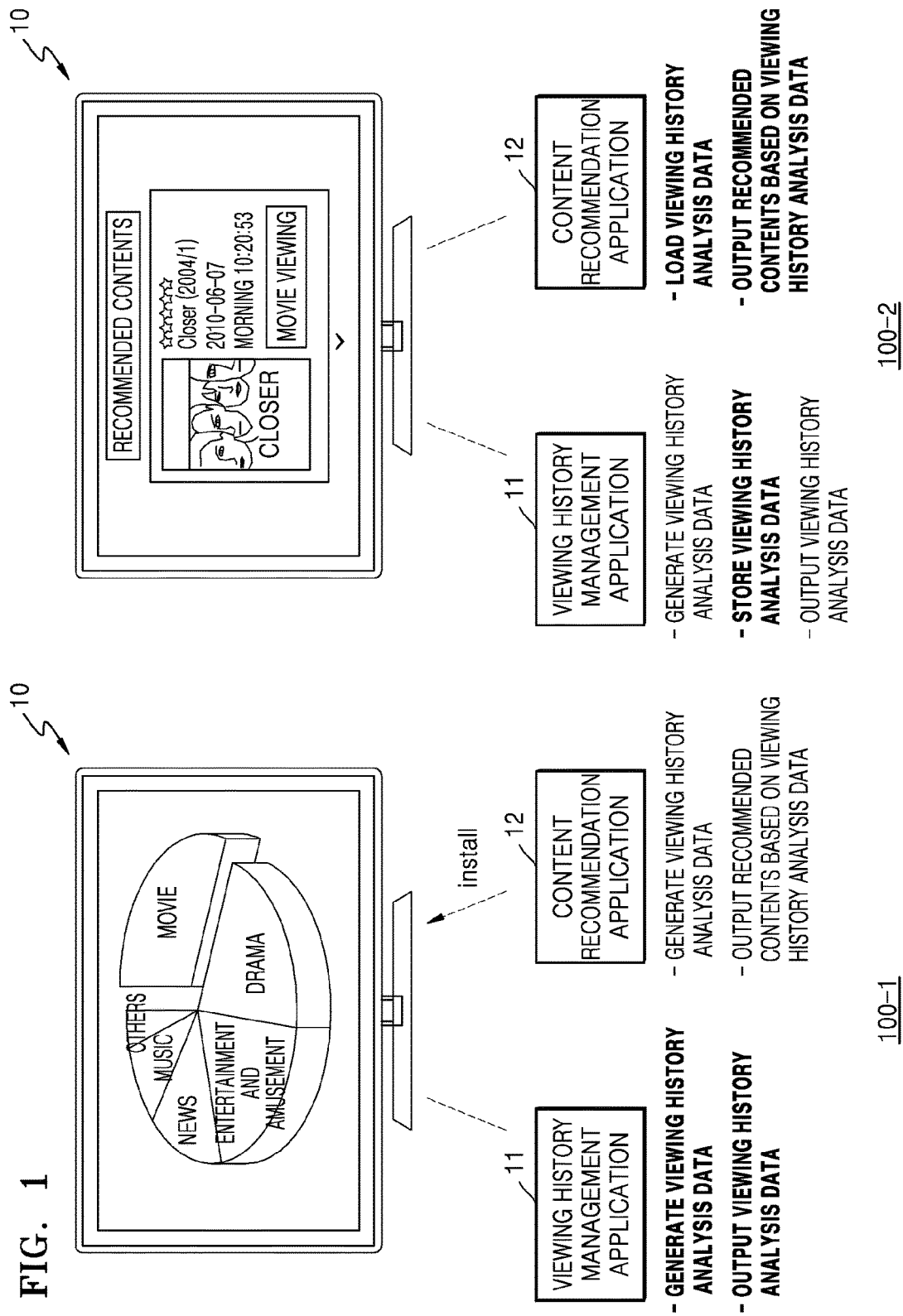
FIG. 1 schematically illustrates a method for executing an application by using a display apparatus, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

The terms used herein will be described in brief, and the exemplary embodiments will be described in detail.

The terms used herein are general terms that are currently widely used in consideration of functions in the exemplary embodiments but may vary according to intentions of those of ordinary skill in the art, precedents, appearances of new technologies, or the like. Also, the applicant may arbitrarily select terms in a particular case, and meanings of the terms corresponding to this case will be described in detail in the description of the exemplary embodiments. Therefore, the terms used herein may be defined based on meanings thereof and the overall contents of the exemplary embodiments not based on names of simple terms.

The terms first, second, etc. may be used herein to describe various elements, these elements may not be limited by these terms. These terms are merely used to distinguish one element from another element. For example, a first element may be termed a second element, and similarly, a second element may be termed a first element without departing from the scope of exemplary embodiments. As used herein, the term "and/or" includes any and all combinations of one or more of the associated listed items.

When a part "comprises" an element in the specification, this may mean that the part may not exclude and may further include other elements as long as there is no contrary description. The term "unit" used herein refers to a hardware element, such as field-programmable gate array (FPGA) or application-specific integrated circuit (ASIC), and performs any role. However, the term "unit" is not limited to software or hardware. The "unit" may be constituted to be in a storage medium that may be addressed or may be constituted to play one or more processors. Therefore, for example, the "unit" includes elements, such as software elements, object-oriented elements, class elements, and task elements, processes, functions, attributes, procedures, sub routines, segments of a program code, drivers, firmware, a microcode, a circuit, data, a database (DB), data structures, tables, arrays, and parameters. Functions provided in elements and "units" may be combined as the smaller number of elements and "units" or may be separated as additional elements and "units".

Throughout the specification, an application may refer to an application program executed in a display apparatus. For example, examples of the application may include any of a voice recognition application, a word processor, a spread sheet, a contacts application, a calendar application, a memo application, an alarm application, a Social Network System (SNS) application, a chatting application, a map application, a music player, a video player, etc. An application according to an exemplary embodiment may refer to software that is executed in a display apparatus in response to a received user input.

Throughout the specification, "content" may refer to digital information displayed on a display unit of a display apparatus. A content according to an exemplary embodiment may include any of a video content (e.g., a TV program image, Video On Demand (VOD), User-Created Contents (UCC), music video, YouTube image, or the like), a still image content (e.g., a photo, a picture, or the like), a text content (e.g., an e-book (a poem, a novel, or the like), a letter, a business file, or the like), a music content (e.g., music, a musical program, a radio broadcast, or the like), application information, or the like but is not limited thereto.

A part of a content that is actually output from the display unit of the display apparatus may be referred to as a screen or a monitor.

Throughout the specification, the term "user" may refer to a person who directly and/or indirectly controls a function or an operation of a display apparatus by using a remote control device (e.g., a remote controller) or the like, and examples of the user may include a user, a manager, and an installation engineer.

FIG. 1 schematically illustrates a method for executing an application by using a display apparatus 10, according to an exemplary embodiment.

Referring to FIG. 1, the display apparatus 10 may output media included in a broadcast signal and execute an application. The application may be an application program executed in the display apparatus 10, such as, for example, any one of a viewing history management application, a content recommendation application, a calendar application, a voice recognition application, a music player, or the like. The application may be pre-installed in the display apparatus 100 or may be downloaded through a wired and/or wireless network connected to the display apparatus 10.

Also, it will be easily understood by those of ordinary skill in the art that the display apparatus 10 may be realized as any of a digital TV, a 3-dimensional (3D) TV, a smart TV, a light-emitting diode (LED) TV, an organic LED (OLED) TV, a plasma TV, a monitor, an analog TV, a curved TV including a screen having a fixed curvature, a flexible TV including a screen having a fixed curvature, a bended TV including a screen having a fixed curvature, and/or a curvature variable TV including a current screen having a curvature changeable by a received user input, but is not limited thereto.

According to an exemplary embodiment, if an application is executed, the display apparatus 10 may process data needed by the application and output a processed result on a screen. For example, referring to 100-1 of FIG. 1, a viewing history management application 11 may generate viewing history analysis data and output the generated viewing history analysis data on the screen. Here, a content recommendation application 12 installed in the display apparatus 10 may access the viewing history analysis data in order to provide a recommended content appropriate for a user.

The display apparatus 10 according to an exemplary embodiment may manage data respectively requested by installed applications and providable data. For example, the viewing history management application 11 may provide the viewing history analysis data to other applications, and the content recommendation application 12 may request the viewing history analysis data from the other applications. In this case, as shown in 100-2 of FIG. 1, if the content recommendation application 12 is executed, the display apparatus 10 may load the viewing history analysis data generated by the viewing history management application 11 so as to save a processing load for generating the viewing history management data.

As described above, if the application is executed, the display apparatus 10 may load and use data processed by another application so as to decrease a processing load of the display apparatus 10.

As described with reference to FIG. 1, the display apparatus 10 stores and manages data associated with applications. However, according to exemplary embodiments, a set-top box or an Internet Protocol (IP) set-top box connected to the display apparatus 10 may store and manage the data associated with the applications. Here, the set-top box or the IP set-top box may be an electronic apparatus that may include a communicator and a processor and communicate with the display apparatus 10 through a wired and/or wireless network.

According to an exemplary embodiment, the set-top box or the IP set-top box connected to the display apparatus 10 may store and/or manage data (or a list of data) respectively requested by applications installed in the display apparatus 10 and providable data (or a list of providable data).

Figure 2:
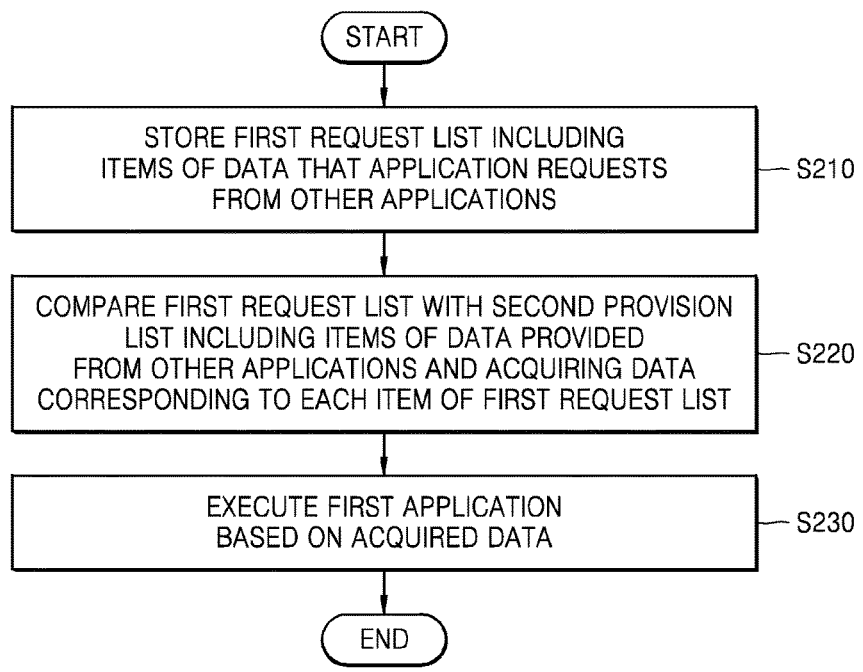
FIG. 2 is a flowchart of a method for executing an application by using a display apparatus, according to an exemplary embodiment.

FIG. 2 is a flowchart of a method for executing an application by using a display apparatus, according to an exemplary embodiment.

Referring to FIG. 2, in operation S210, the display apparatus 10 may store a first request list including items of data that a first application requests from other applications. Here, the items of the data included in the first request list may be expressed with at least one selected from letters, numbers, and symbols representing data requested by an application or as categories, formats, types, or the like of the data. For example, the items may be expressed with letters like the viewing history analysis data or as content names, the number of viewings of the user, viewing periods, or content information.

According to an exemplary embodiment, the display apparatus 10 may store a first provision list including items of data that a first application may provide to other applications. Here, the data provided to the other applications may include any of a result value acquired by processing data through the first application or an intermediate calculation value. A method for providing data from a first application to other applications will be described in detail later with reference to FIG. 4.

According to an exemplary embodiment, a time when a request list and a provision list of each application are stored may be a time when each application is installed in the display apparatus 10.

Also, the request list and the provision list of each application may be pre-set by each application developer or each application provider (e.g., a business operator providing an application, a business operator selling an application, or the like). The request list and the provision list of each application may also be modified or added by a user of the display apparatus 10 or automatically.

In operation S220, the display apparatus 10 may compare the first request list and a second provision list including items of data provided by other applications and acquire data corresponding to each of the items of the first request list. The items included in the second provision list may be expressed in the same forms as or similar forms to the items included in the first request list. Therefore, the display apparatus 10 may respectively compare the items included in the first request list and the items included in the second provision list to extract items of the second provision list that are the same as or similar to the items of the first request list.

According to an exemplary embodiment, the second provision list may further include address information storing data corresponding to each of the items of the second provision list. Here, the address information may be virtual addresses (referred to as logical addresses according to exemplary embodiments) recognized by the display apparatus 10 or actual addresses (referred to as physical addresses according to exemplary embodiments) on a memory storing data. Therefore, the display apparatus 10 may acquire data corresponding to the extracted items of the second provision list by using the address information of the second provision list.

The address information included in the second provision list may include values set by the display apparatus 10.

FIG. 3A illustrates a first request list and a second provision list, according to an exemplary embodiment.

Referring to FIG. 3A, as a first application is installed, the display apparatus 10 may store a first request list 310 including a first item and a second item.

If the first application is executed, the display apparatus 10 may compare the first item and the second item (i.e., a second provision list 320) with items of data provided by second and third applications.

Figure 3B:
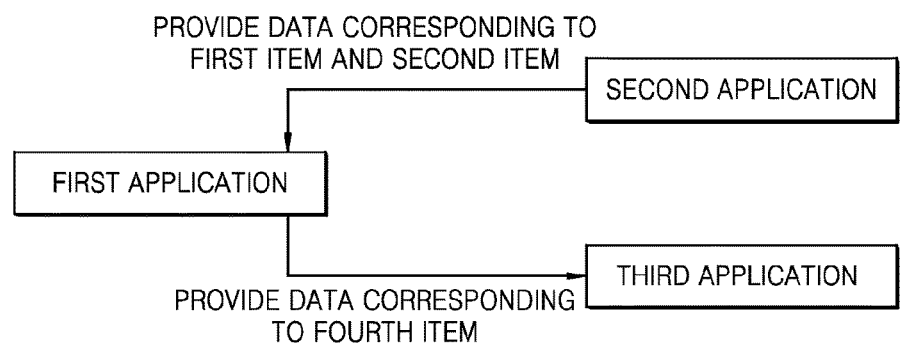
FIG. 3B illustrates a comparison result between a first request list and a second provision list.

FIG. 3B illustrates a comparison result between a first request list and a second provision list, according to an exemplary embodiment.

As shown in FIG. 3B, the items (i.e., the first item and the second item) of the first request list 310 exist in the second provision list 320. Therefore, the display apparatus 10 may acquire data corresponding to the items of the first request list 310. Here, the display apparatus 10 may acquire data corresponding to each item by using address information included in the second provision list 320.

Referring to FIG. 2 again, in operation S230, the display apparatus 10 may execute the first application based on the acquired data. Therefore, the display apparatus 10 may use the acquired data to omit some processing jobs.

Figure 4:
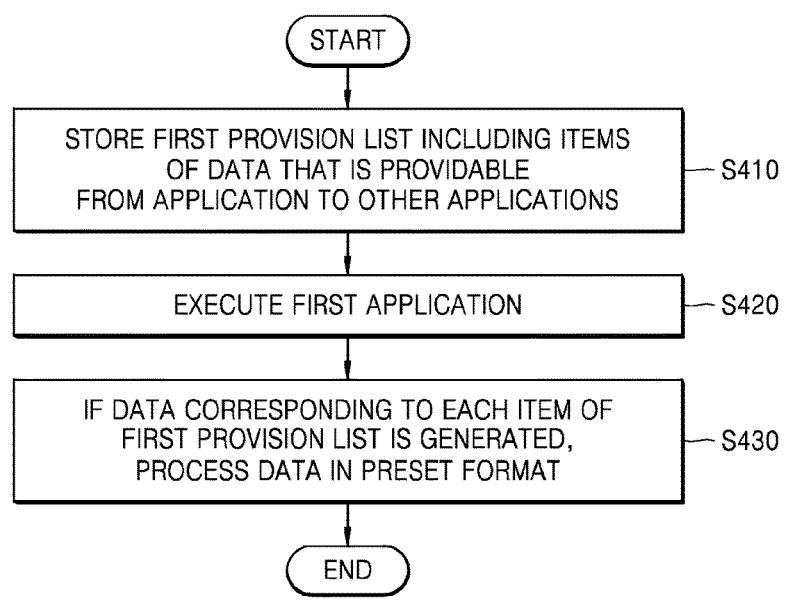
FIG. 4 is a flowchart of a method for providing other applications with providable data of an application by using a display apparatus, according to an exemplary embodiment.

FIG. 4 is a flowchart of a method for providing providable data of an application to other applications by using a display apparatus, according to an exemplary embodiment.

Referring to FIG. 4, in operation S410, the display apparatus 10 may store a first provision list including items of data that a first application may provide to other applications. Here, items of data included in a provision list may be expressed with at least one selected from letters, numbers, and symbols representing data provided by an application or as categories, formats, types or the like of data.

According to an exemplary embodiment, the display apparatus 100 may store a first request list and a first provision list at a time when the first application is installed.

In operation S420, the display apparatus 10 may execute the first application. According to an exemplary embodiment, the display apparatus 10 may compare the first request list and a second provision list to load data corresponding to the first request list and then execute the first application. Operation S420 corresponds to operations S220 and S230 of FIG. 2, and thus a detailed description thereof is omitted.

If data corresponding to items of the first provision list is generated when executing the first application, the display apparatus 10 may process the data in a preset format in operation S430. The purpose of this operation is to enable the other applications to easily use data provided by the first application.

For example, if viewing history analysis information of a user is generated when executing a viewing history management application, the display apparatus 10 may process generated data in a format of a content name, the number of viewings of the user, cumulative viewing times, or content information). Also, the processed data may be stored in a preset address included in a provision list.

According to an exemplary embodiment, the display apparatus 10 may determine a format for storing providable data of each application. Alternatively, a format for storing data by a developer or a provider of each application may be determined.

The same data may be stored in different formats. For example, if the viewing history analysis information of the user is generated, the display apparatus 10 may store generated data in a format of a content name, the number of viewings of the user, a cumulative viewing time, or content information and a format of a content genre or cumulative viewing times.

Figure 5:
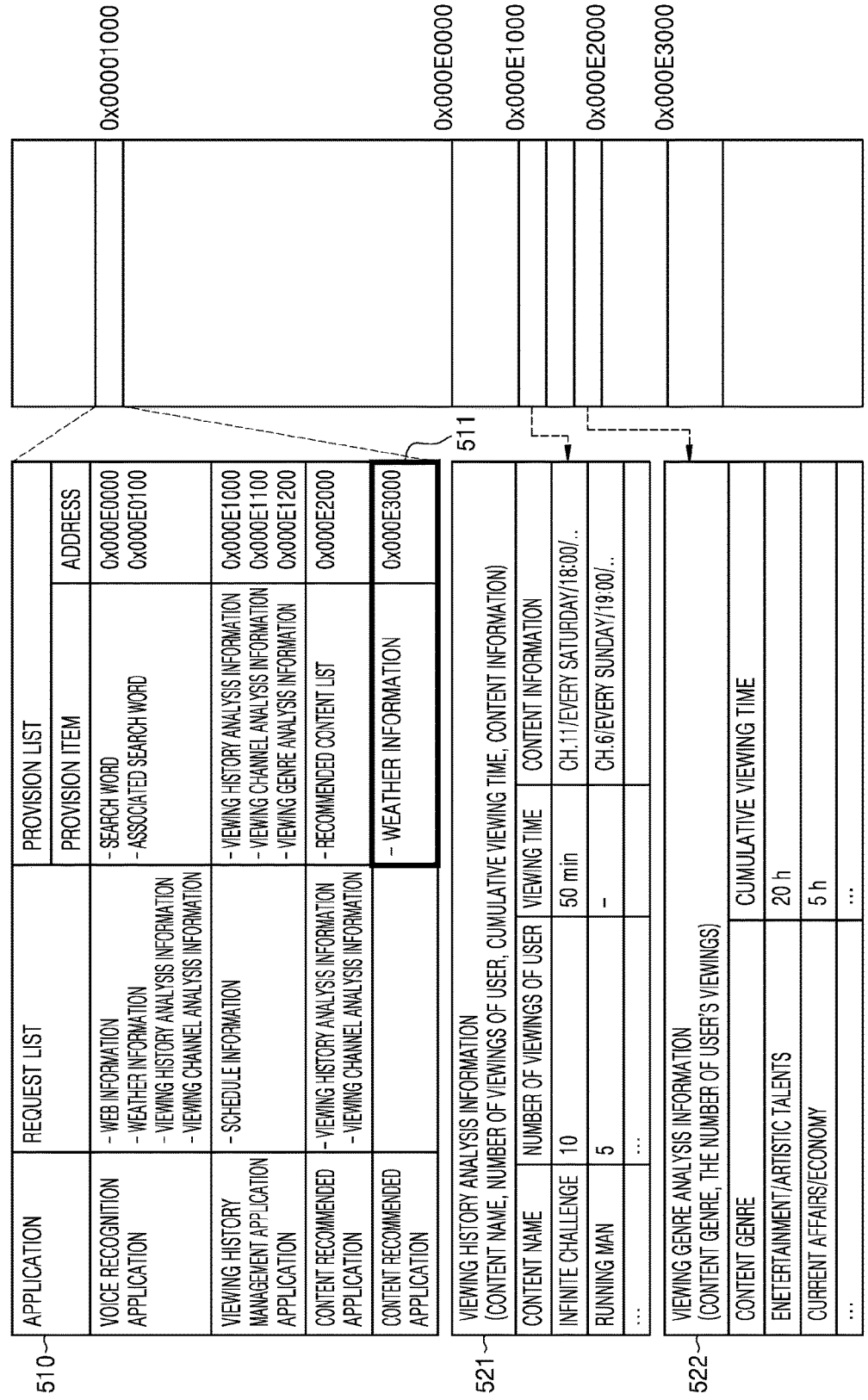
FIG. 5 illustrates a request list and a provision list of each application stored in a display apparatus, according to an exemplary embodiment.

FIG. 5 illustrates a request list and a provision list of each application stored in a display apparatus, according to an exemplary embodiment.

Referring to FIG. 5, the display apparatus 10 may separately store a request list and provision list 510 of each application and providable data 521 and 522 of applications on a memory. As shown in FIG. 5, the request list and provision list 510 of each application and providable data 521 of the applications may be stored in different areas on the memory to have different virtual address areas. For example, the request list and provision list 510 of each application may be stored in address area "0x00001000", and the providable data 521 of the applications may be stored in address area "0x000E0000".

Alternatively, if the display apparatus 10 includes a plurality of memories, the request list and provision list 510 of each application and the providable data 521 and 522 of the applications may be stored on different memories. For example, the display apparatus 10 may store the request list and provision list 510 of each application on a cache memory or a memory of a central processing unit (CPU) to enable rapid access to the request list and provision list 510 of each application. The display apparatus 10 may store the providable data 521 and 522 of the applications in a preset area on a main memory.

Figure 6:
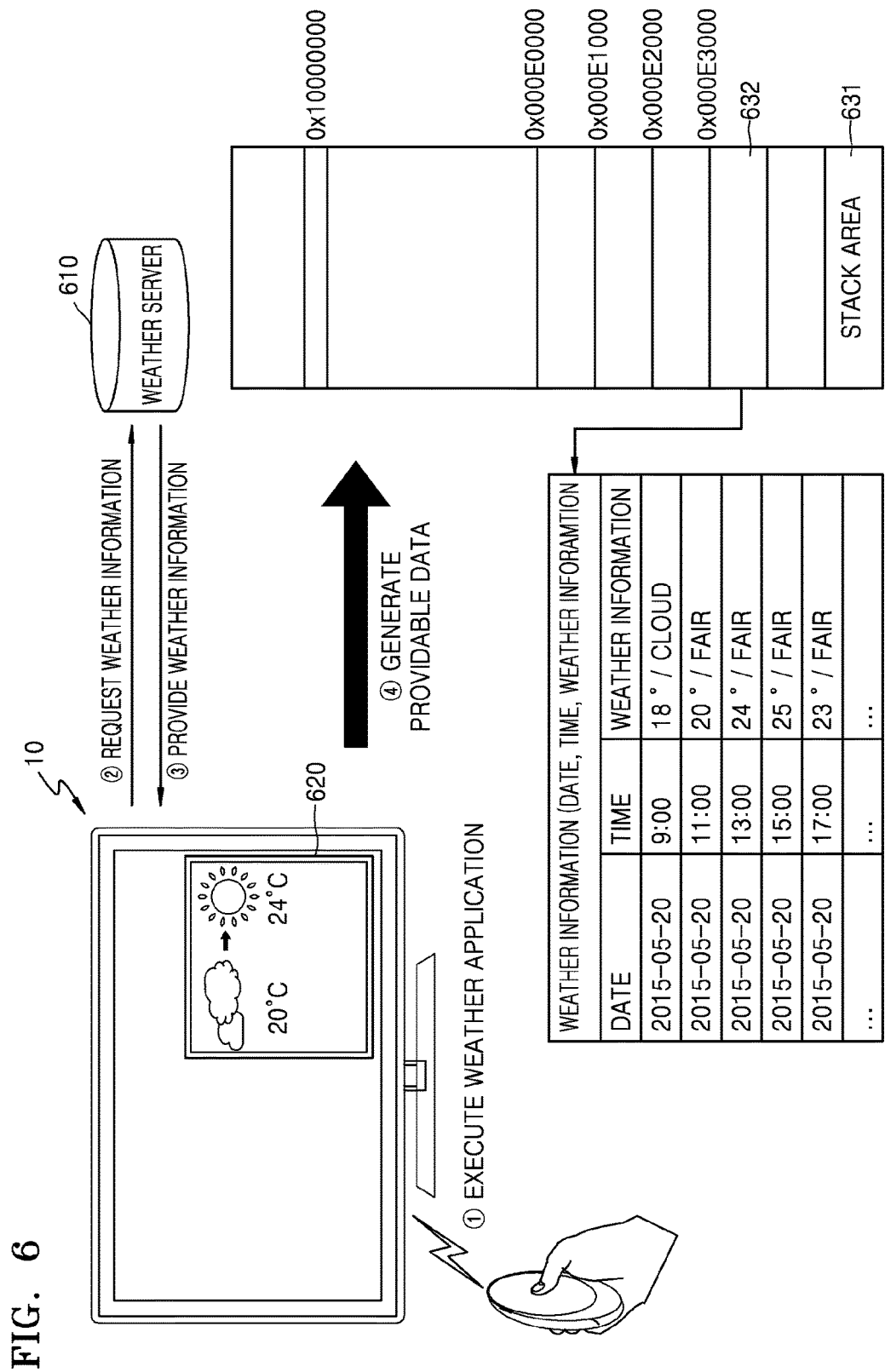
FIG. 6 illustrates generation of providable data by using a display apparatus when executing an application, according to an exemplary embodiment.

FIG. 6 illustrates generation of providable data by using a display apparatus when executing an application, according to an exemplary embodiment.

Referring to FIG. 6, the display apparatus 10 may execute a weather application in response to a user input. If the weather application is executed, the display apparatus 10 may request weather information from an external weather server 610 and receive weather information through a wired and/or wireless network. The display apparatus 10 may process the received weather information and output a processed result 620 on a screen. Here, a virtual address area that stores a result value and/or an intermediate calculation value acquired by processing the received weather information through the display apparatus 10 may be a stack area 631 preset by the display apparatus 10.

The display apparatus 10 may also process weather information processed in the stack area 631 in a format of a date, a time, or weather information and store the processed weather information in an address area 632 corresponding to a weather information item of a provision list 511 of FIG. 5 of a weather application.

If data equal or similar to processed data is pre-stored, the display apparatus 10 may update or replace the pre-stored data based on the processed data.

Figure 7:
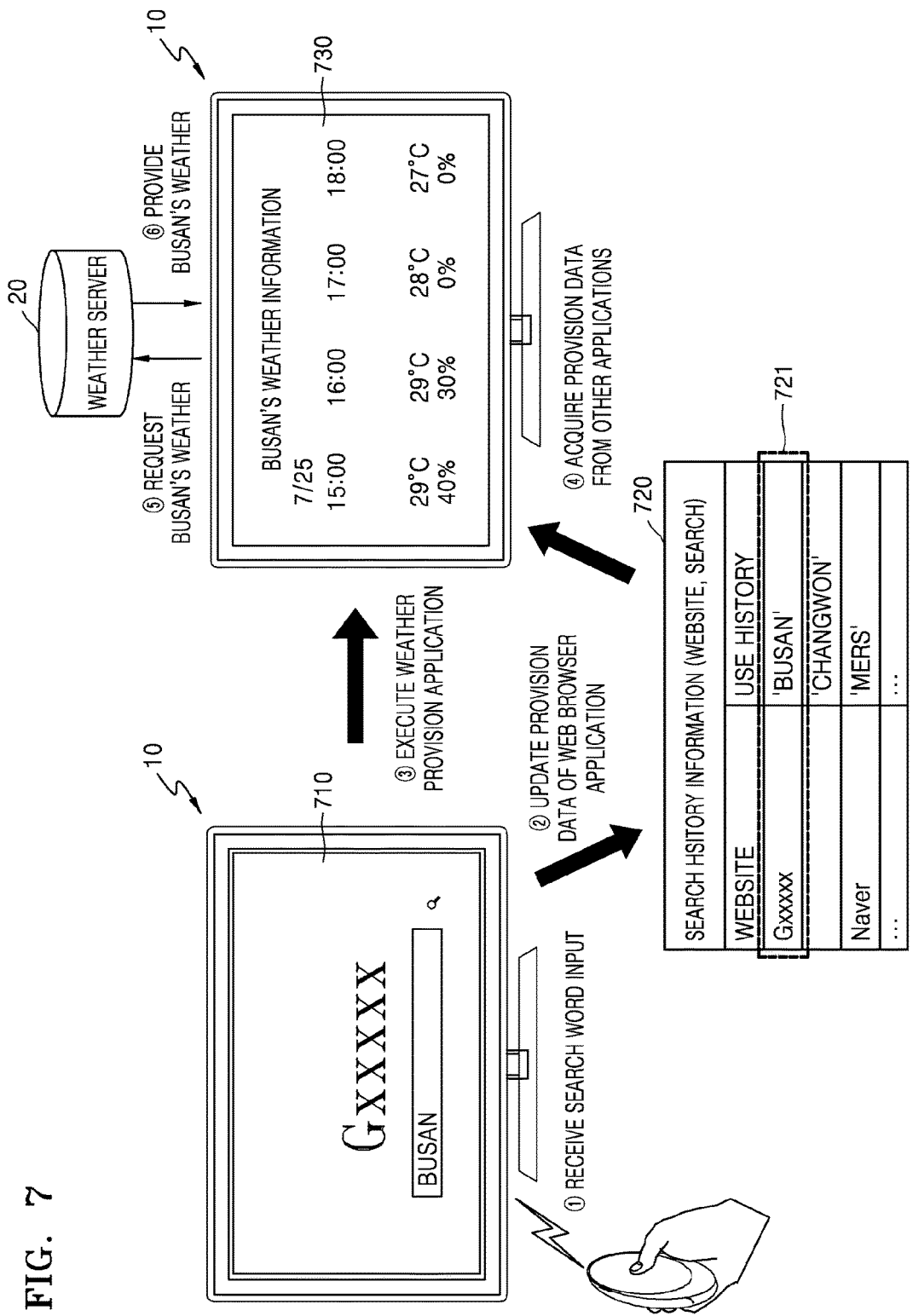
FIG. 7 illustrates a method for executing an application by using a display apparatus, according to another exemplary embodiment.

FIG. 7 illustrates a method for executing an application by using a display apparatus, according to another exemplary embodiment. According to an exemplary embodiment, the display apparatus 10 may execute a second application based on data provided from a first application.

Referring to FIG. 7, the display apparatus 10 may receive a search word "Busan" on an execution screen 710 of a web application. Here, the display apparatus 10 may update search history information 720 that is data provided from the web application to other applications.

The display apparatus 10 may receive a command for executing a weather application from a user. The display apparatus 10 may acquire the search history information 720 provided from the web application. The display apparatus 10 may request "Busan's Weather" from a weather server 20 based on the latest search word "Busan" 721 of the data provided from the web application. Therefore, an execution screen 730 of the weather application may include Busan's weather information. As described above, an application executed in the display apparatus 10 may be affected by execution results of other applications.

Figure 8:
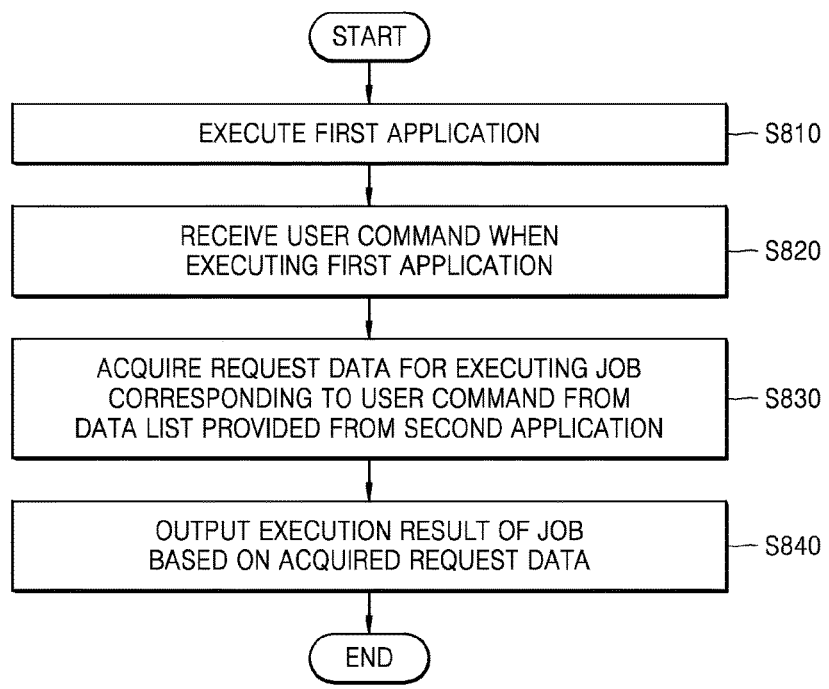
FIG. 8 is a flowchart of a method for using data provided from another application by using a display apparatus when executing an application, according to an exemplary embodiment.

FIG. 8 is a flowchart of a method for using data provided from another application by using a display apparatus when executing an application, according to an exemplary embodiment.

Referring to FIG. 8, in operation S810, the display apparatus 10 may execute a first application.

According to an exemplary embodiment, the display apparatus 10 may compare a first request list of the first application with a second provision list provided from other applications to load data corresponding to each item of the first request list. For example, referring to the request list and provision list 510 of each application of FIG. 5, if a voice recognition application is executed, the display apparatus 10 may load weather information, viewing history analysis information, and viewing channel analysis information from web information, the weather information, the viewing history analysis information, and the viewing channel analysis information requested by the voice recognition application.

In operation S820, when executing the first application, the display apparatus 10 may receive a user command. For example, the display apparatus 10 may receive a user command through an external control device such as a remote controller or the like or a user interface of the display apparatus 10.

In operation S830, the display apparatus 10 may acquire request data for executing a job corresponding to the user command from a data list provided from a second application. For example, the display apparatus 10 may acquire today's weather information from a weather information data list provided from a weather application, for a job corresponding to the user command requesting the today's weather information.

In operation S840, the display apparatus 10 may output an execution result of the job based on the acquired request data. For example, the display apparatus 10 may output the today's weather information through the execution screen of the first application.

As described above, for the execution of the job corresponding to the user command, the display apparatus 10 may repeatedly execute the same job as another application or may use data provided from another application without re-executing the another application in order to decrease a processing load.

Figure 9:
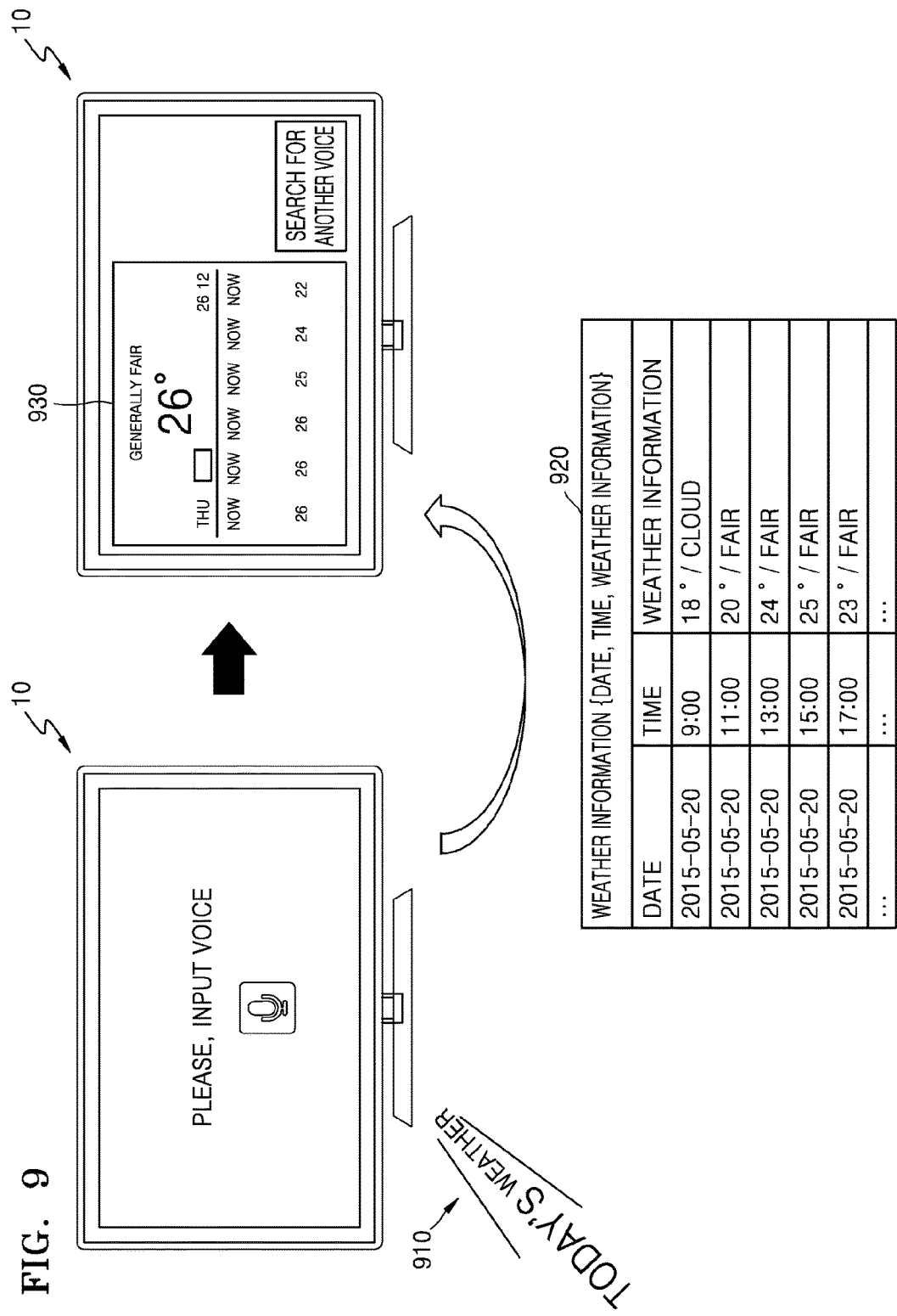
FIG. 9 illustrates outputting of a job result from a voice recognition application based on a data list provided from a weather application, according to an exemplary embodiment.

FIG. 9 illustrates outputting of a job result based on a data list with which a voice recognition application is provided from a weather application, according to an exemplary embodiment.

Referring to FIG. 9, as a voice recognition application is executed, the display apparatus 10 may acquire data that the voice recognition application requests from other applications. For example, referring to FIG. 5, the display apparatus 10 may compare a request list of the voice recognition application with a provision list of other applications to acquire weather information, viewing history analysis information, and viewing channel analysis information.

If a user command 910 requesting "today's weather" is received, the display apparatus 10 may acquire today's weather information data from an acquired weather information data list 920. The display apparatus 10 may also output today's weather information 930 based on the acquired today's weather information data.

As described above, to provide the today's weather information when executing the voice recognition application, the display apparatus 10 may use data provided from a weather application without accessing an external server, as shown in FIG. 6, to output the today's weather information.

Figure 10:
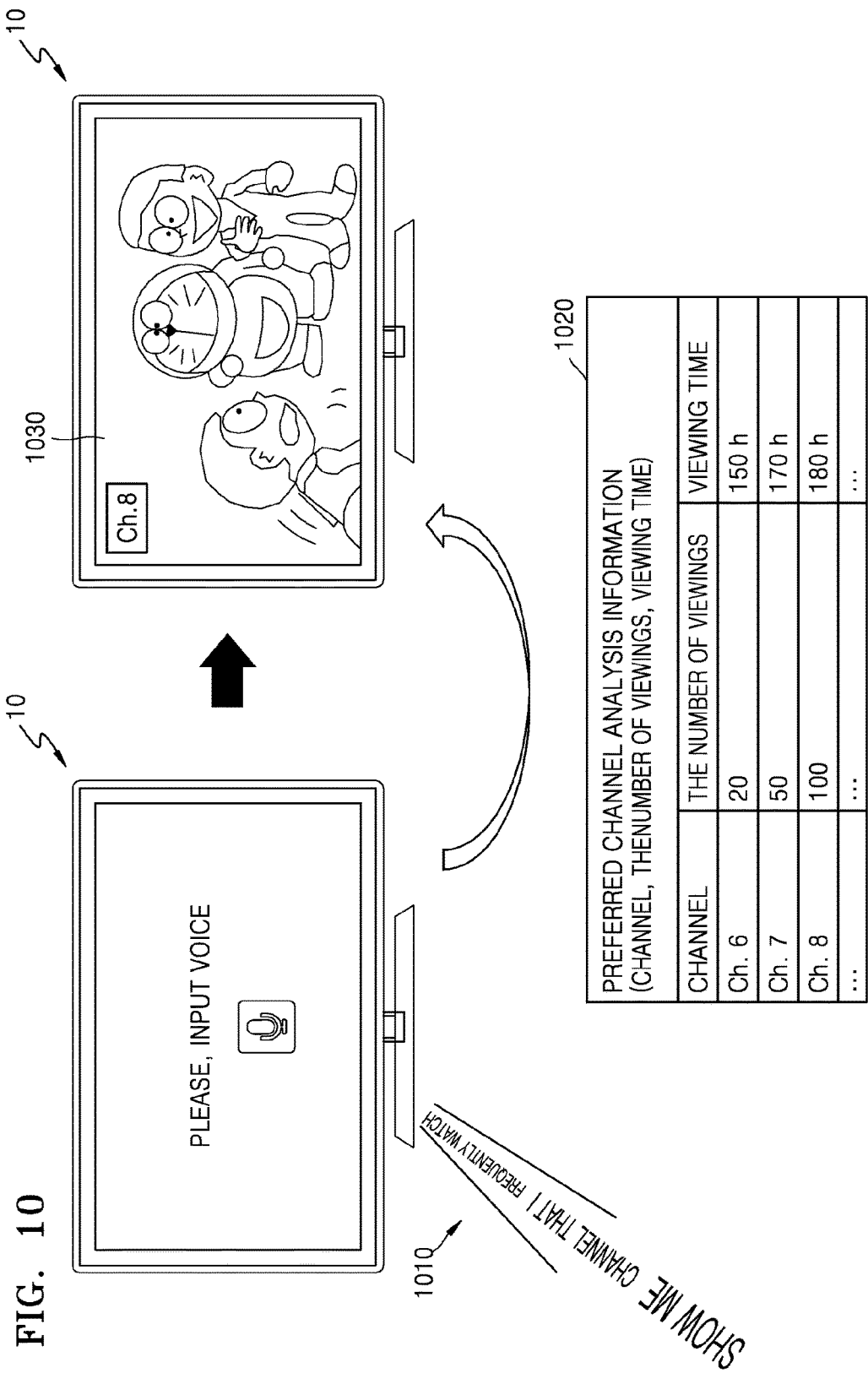
FIG. 10 illustrates outputting of a job result from a voice recognition application based on a data list provided from a viewing history management application, according to an exemplary embodiment.

FIG. 10 illustrates outputting of a job result based on a data list with which a voice recognition application is provided from a viewing history management application, according to an exemplary embodiment.

Referring to FIG. 10, the display apparatus 10 may receive a user command 1010 "Show me the channel that I frequently watch" when executing a voice recognition application. In this case, the display apparatus 10 may determine channel information that a user views most frequently, as "8" from a viewing channel analysis information data list 1020 acquired when executing the voice recognition application. The display apparatus 10 may output a content 1030 of broadcast channel No. 8 according to the determination result.

As described above, the display apparatus 10 may use the data list provided from the viewing history analysis application to omit a job of analyzing viewing history information of the user.

Figure 11:
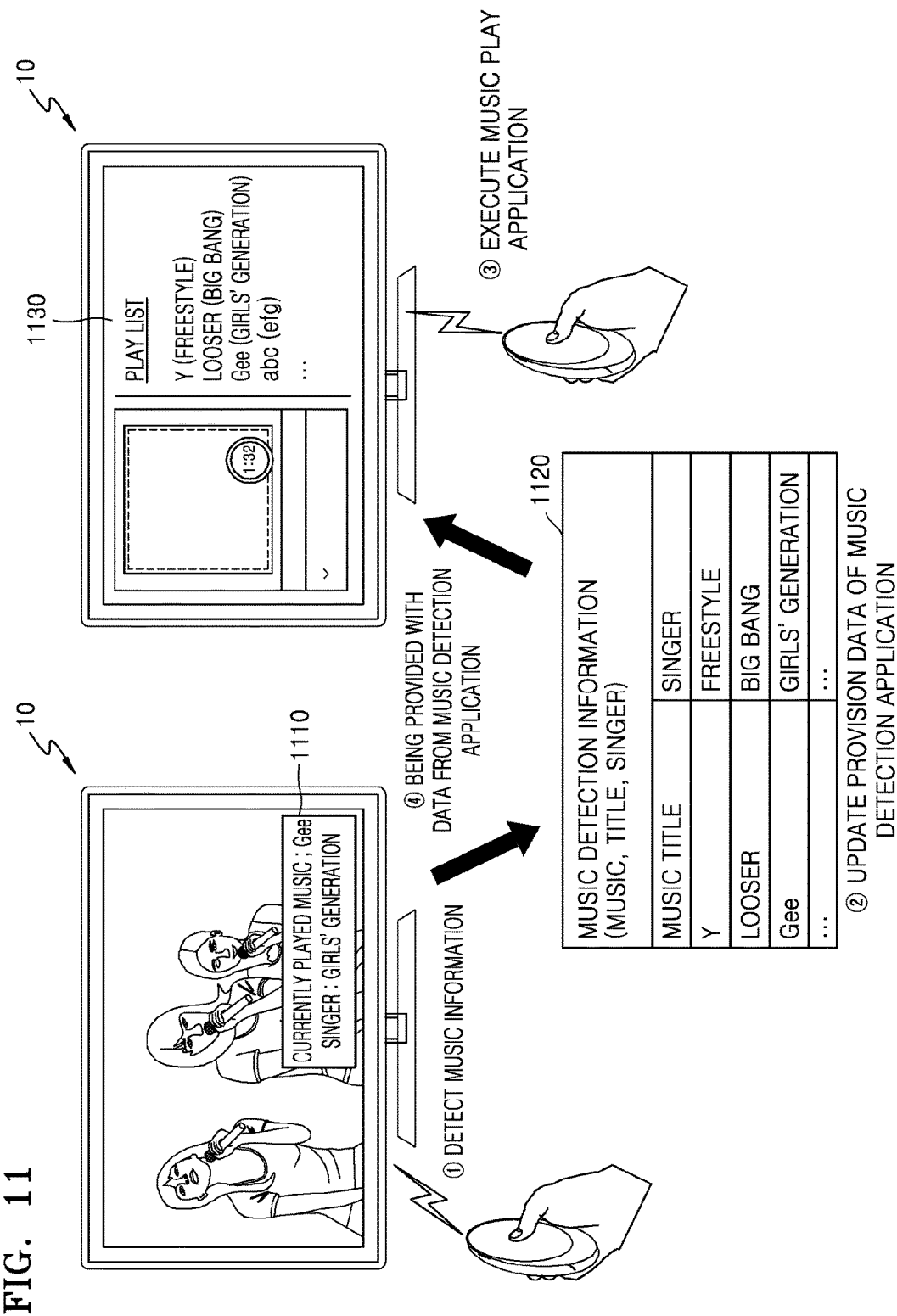
FIG. 11 illustrates a method for executing an application by using a display apparatus, according to another exemplary embodiment.

FIG. 11 illustrates a method of executing an application by using a display apparatus, according to another exemplary embodiment.

Referring to FIG. 11, a user may execute a music information detection application when viewing a music broadcast program. Here, the music information detection application is an application searching for information about music output from the display apparatus 10 and may provide music detection information to other applications. The display apparatus 10 may detect music information 1110 of a broadcast program that the user is currently viewing, output the detected music information 1110 on a screen, and process the detected music information in a format of a music title, a singer, or the like to provide the detected music information to other applications in response to a user command.

If the user executes a music player in the display apparatus 10, the display apparatus 10 may output a play list 1130 including pieces of music detected by the user, based on a music detection information data list 1120 provided from the music detection application.

Figure 12:
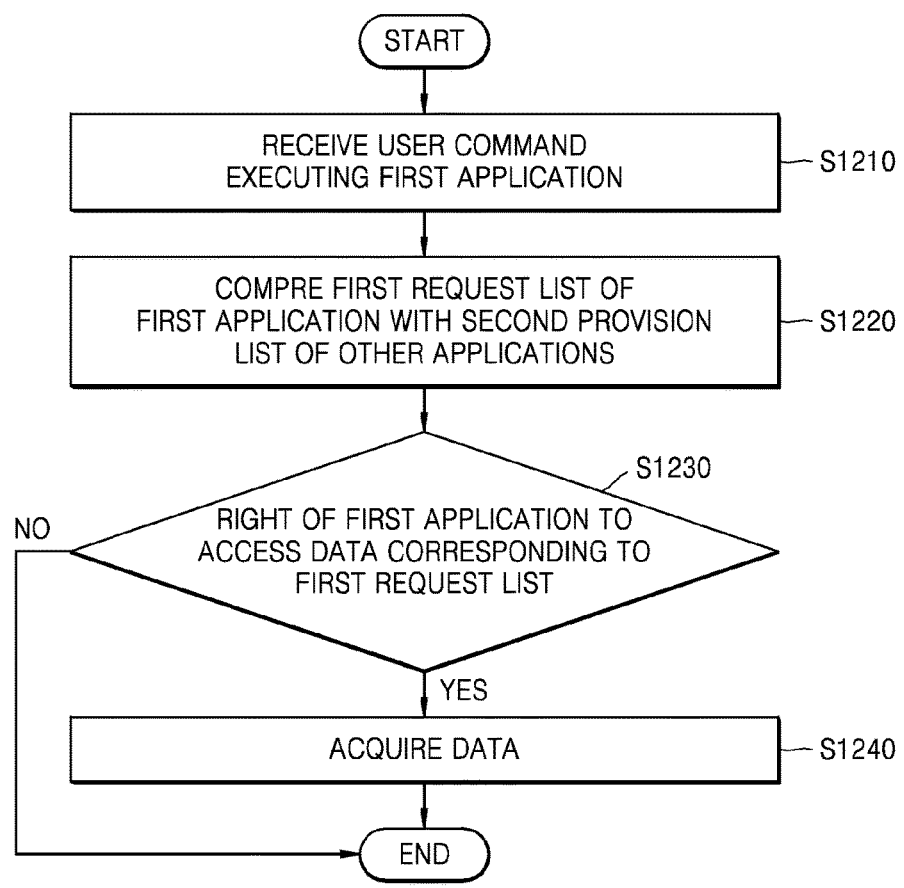
FIG. 12 is a flowchart of a method for executing an application by using a display apparatus, according to another exemplary embodiment.

FIG. 12 is a flowchart of a method of executing an application by using a display apparatus, according to another exemplary embodiment.

Referring to FIG. 12, in operation S1210, the display apparatus 10 may receive a user command executing a first application.

In operation S1220, the display apparatus 10 may compare a first request list of the first application with a second provision list provided from other applications. The display apparatus 10 may extract items equal or similar to items of the first request list, from items of the second provision list.

According to an exemplary embodiment, the second provision list may further include authorization information of another application that may access providable data of each application. Here, the authorization information may be set according to items of the second provision list or according to applications. For example, the first application may have a right to access data provided by a second application but may not have a right to access data provided by a third application. The authorization information may also be set by the display apparatus 10 or by an application developer or provider.

In operation S1230, the display apparatus 10 may determine whether the first application has a right to access data corresponding to an extracted item, based on the authorization information included in the second provision list.

If the first application has the right to access the data corresponding to the extracted item of the first request list, the display apparatus 10 may acquire data provided by another application in operation S1240. In this case, the display apparatus 10 may execute the first application based on the acquired data. If the first application does not have the right to access the data corresponding to the extracted item of the first request list, the display apparatus 10 may perform a processing job for generating corresponding data.

FIG. 13A illustrates a first request list and a second provision list, according to an exemplary embodiment.

Referring to FIG. 13A, a first request list may include items of data that a first application requests from another application, and a second provision list 1320 may include items of data provided from other applications, address information in which the data is stored, and authorization information of applications that may access the data. If the first application is executed, the display apparatus 10 may compare first and second items with items of data included in the second provision list 1320.

Figure 13B:
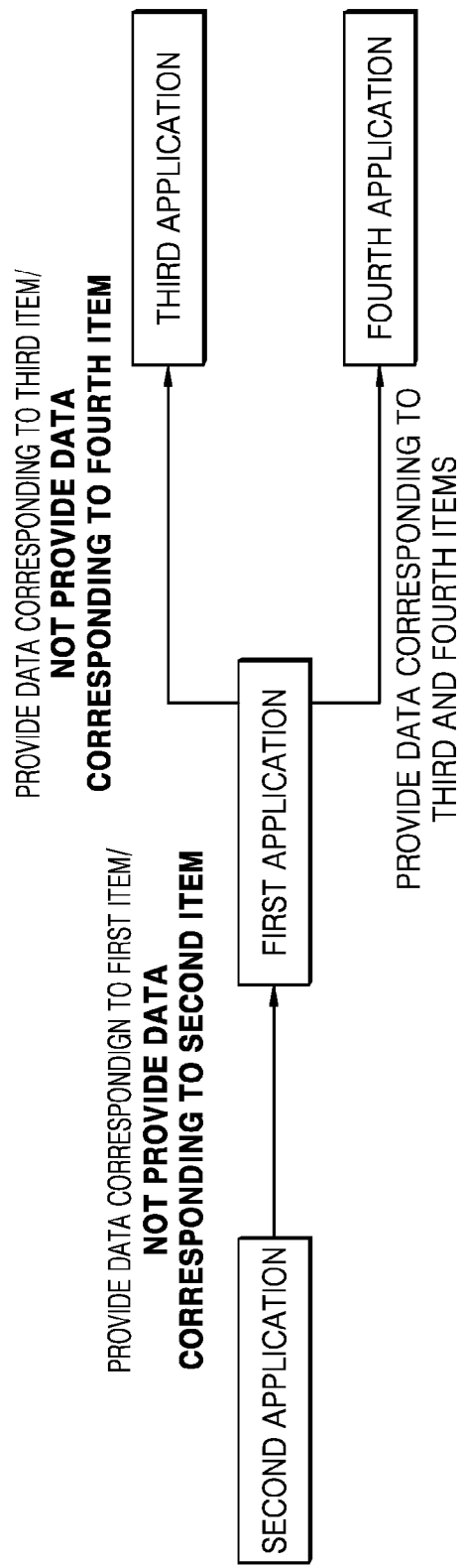
FIG. 13B illustrates data provided to a first application and providable data of the first application, according to an exemplary embodiment.

FIG. 13B illustrates data with which a first application is provided and providable data of the first application, according to an exemplary embodiment.

Referring to FIG. 13B, the display apparatus 10 may acquire merely data corresponding to a first item based on a comparison result between a first request list 1310 and a second provision list 1320 and authorization information of the first application.

The first application may provide other applications with data corresponding to third and fourth items. Here, a third application has a right to access merely data corresponding to the third item from the first application and thus regenerates data corresponding to the fourth item. However, a fourth application may have a right to the third and fourth items and thus may acquire data corresponding to the third and fourth items from the first application.

Figure 14:
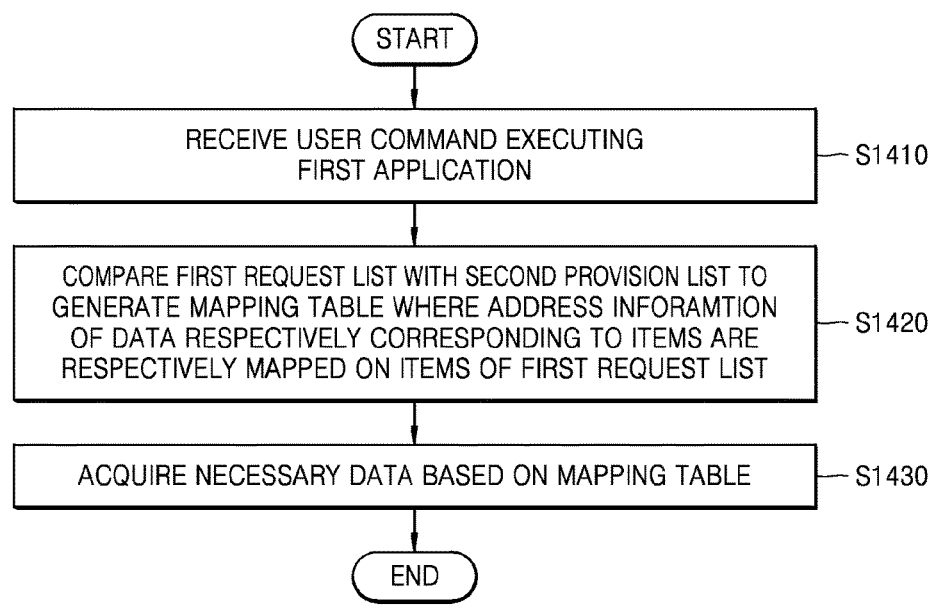
FIG. 14 is a flowchart of a method for executing an application by using a display apparatus, according to another exemplary embodiment.

FIG. 14 is a flowchart of a method for executing an application by using a display apparatus, according to another exemplary embodiment.

Referring to FIG. 14, in operation S1410, the display apparatus 10 may receive a user command executing a first application.

In operation S1420, the display apparatus 10 may compare a first request list including items of data that the first application requests from other applications, with a second provision list including items of data provided from the other applications to generate a mapping table where items of data that may be acquired by the first application from another application are mapped on address information in which the data is stored.

According to an exemplary embodiment, if the second provision list includes authorization information of an application, the mapping table may include merely address information about an item of data that the first application may access.

In operation S1430, the display apparatus 10 may acquire necessary data based on the mapping table when executing the application. If a memory space is limited, the display apparatus 10 may selectively load data necessary when executing the first application instead of loading data corresponding to the first request list when executing the first application. Alternatively, if the first application requests many items of data (e.g., the first request list includes items higher than or equal to a preset number) or a size of data requested by the first application is great, the display apparatus 10 may not pre-load data corresponding to the first request list.

According to exemplary embodiments, operation S1420 may be omitted. In this case, the display apparatus 10 may compare the first request list with the second provision list when executing the first application.

Figure 15:
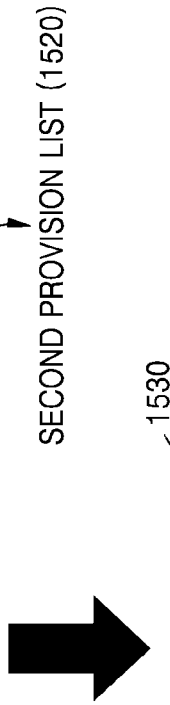
FIG. 15 illustrates a mapping table generated by a display apparatus, according to an exemplary embodiment.

FIG. 15 illustrates generation of a mapping table by using a display apparatus, according to an exemplary embodiment.

Referring to FIG. 15, the display apparatus 10 may compare a first request list 1510 and a second provision list 1520 in response to a user command executing a first application. The display apparatus 10 may generate a mapping table 1530 including an item of data that may be loaded by a first application and address information in which the data is stored, based on the comparison result and authorization information included in the second provision list 1520.

The display apparatus 10 may load data corresponding to a first or fifth item based on the mapping table 1530 when executing the first application.

Figure 16:
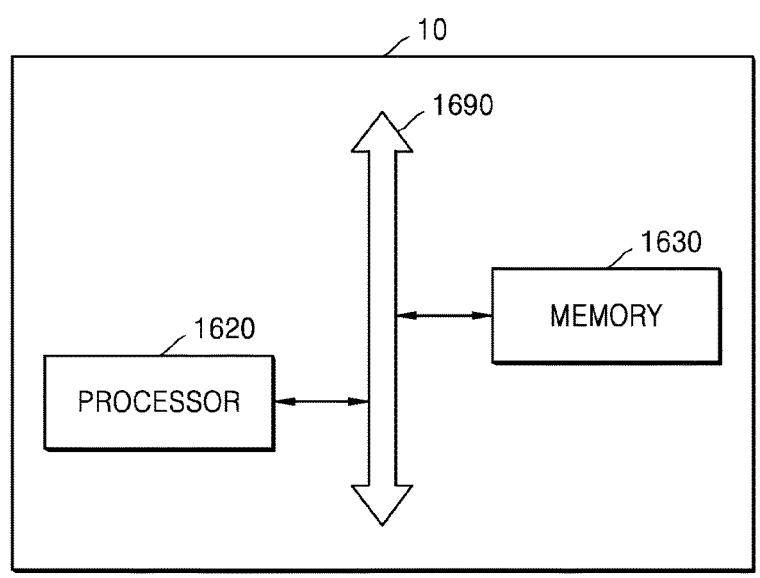
FIG. 16 is a block diagram of a configuration of a display apparatus, according to an exemplary embodiment.

FIG. 16 is a block diagram of a configuration of the display apparatus 10, according to an exemplary embodiment.

Referring to FIG. 16, the display apparatus 10 includes a processor 1620 and a memory 1630. Several elements included in the display apparatus 10 may be connected to one another through a bus 1690.

The processor 1620 may control an execution of an application. According to an exemplary embodiment, when installing an application, the processor 1620 may control the memory 1630 to store a request list including items of data that the application requests from other applications and a provision list including items of data that the application may provide to the other applications. Here, the request list and the provision list may be preset by a developer or provider of the application (e.g., an application business operator, an application seller, or the like). Also, each item may be expressed with at least one selected from letters, numbers, and symbols that represent data requested (providable) by the application or may be expressed as categories, formats, types, or the like of data. For example, each item may be expressed in letters like "viewing history analysis data" or may be expressed as a content name, the number of viewings of a user, a viewing time, or content information. Also, the provision list may further include address information in which items of data and the data are stored. Also, according to exemplary embodiments, the provision list may further include authorization information of other applications that may access data.

As a first application is executed, the processor 1620 may compare a first request of the first application with a second provision list including items of data provided by other applications and acquire data corresponding to the first request list from the memory 1630. Alternatively, when executing the first application, the processor 1620 may compare the first request list and the second provision list to acquire necessary data from the memory 1630.

Also, if providable data of the first application is processed when executing the first application, the processor 1620 may process the processed data in a preset format. Also, the processor 1620 may store the processed data in a preset address based on a first provision list including items of the providable data of the first application and address information of data.

The processor 1620 may be a hardware element that is realized as at least one processor, such as, for example, a central processing unit (CPU), an application processor (AP), or the like and perform a function of controlling an overall operation of the display apparatus 10. Also, according to embodiments, the processor 1620 may be referred to as a CPU, a graphic processing unit (GPU), a microprocessor, or the like.

The memory 1630 may be a hardware element that stores data processed in the display apparatus 10 and may be realized as any of a hard disk drive (HDD), a solid state drive (SDD), a random access memory (RAM), a read only memory (ROM), or the like.

According to an exemplary embodiment, the memory 1630 may store a request list including items of data that each application requests from other applications and a provision list including items of data that each application may provide to the other applications, under control of the processor 1620. Also, the provision list may further include address information of the data. The provision list may also further include authorization information of the other applications that may access the data.

Also, the memory 1630 may store the request list and the provision list of each application, and providable data of each application in a preset area.

Figure 17:
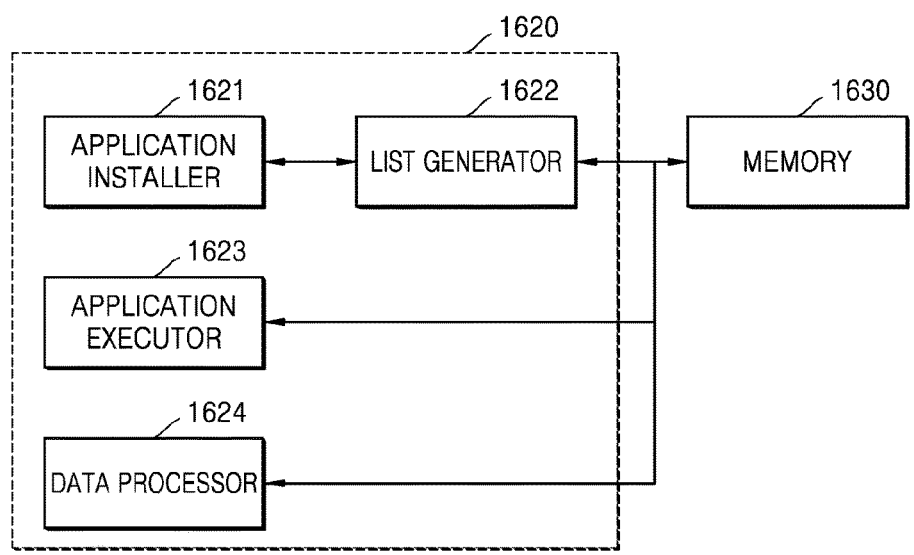
FIG. 17 is a block diagram of a detailed configuration of a processor, according to an exemplary embodiment.

FIG. 17 is a block diagram of a detailed configuration of the processor 1620, according to an exemplary embodiment.

Referring to FIG. 17, the processor 1620 may include an application installer 1621, a list generator 1622, an application executor 1623, and a data processor 1624.

According to an exemplary embodiment, the application installer 1621 may install an application in the display apparatus 10. For example, the application installer 1621 may install the application based on application installation information received from an external source. Here, the application installer 1621 may acquire information about items of data requested by the application and items of providable data of the application. The application installer 1621 may also provide the acquired information about the items to the list generator 1622.

According to an exemplary embodiment, the list generator 1622 may generate a request list and a provision list of the application based on the information of the items provided from the application installer 1621. Here, the list generator 1622 may determine whether each of the items is expressed in a preset form. If there is an item that is expressed in another form, the list generator 1622 may delete the item or may correct the item in a proper form.

Also, the list generator 1622 may allocate address information in which data corresponding to each of the items of the provision list will be stored. The allocated address information may be included in the provision list.

The list generator 1622 may also allocate authorization information of other applications that may access data corresponding to each of the items of the provision list. The allocated authorization information of the other applications may be included in the provision list.

According to an exemplary embodiment, the application executor 1623 may perform a preparation job for executing the application based on a control command executing the application. The application executor 1623 may compare items included in the request list of the application and items included in a provision list of the other applications. If the items included in the request list of the application are included in a provision list of another application, the application executor 1623 may acquire data corresponding to the request list from the memory 1630.

Alternatively, when executing the application, the application executor 1623 may compare the items included in the request list of the application with the items of the provision list of the other applications. In this case, a time taken for the preparation job for executing the application may be reduced.

Also, the application executor 1623 may process data included in a provision list of the application when executing the application. In this case, the application executor 1623 may provide the processed data to the data processor 1624.

According to an exemplary embodiment, the data processor 1624 may process providable data of the application in a preset format. This is to enable the other applications to easily use data provided by a first application. The data processed by the data processor 1624 may be stored in a preset area of the memory 1630 determined by the list generator 1622.

Figure 18:
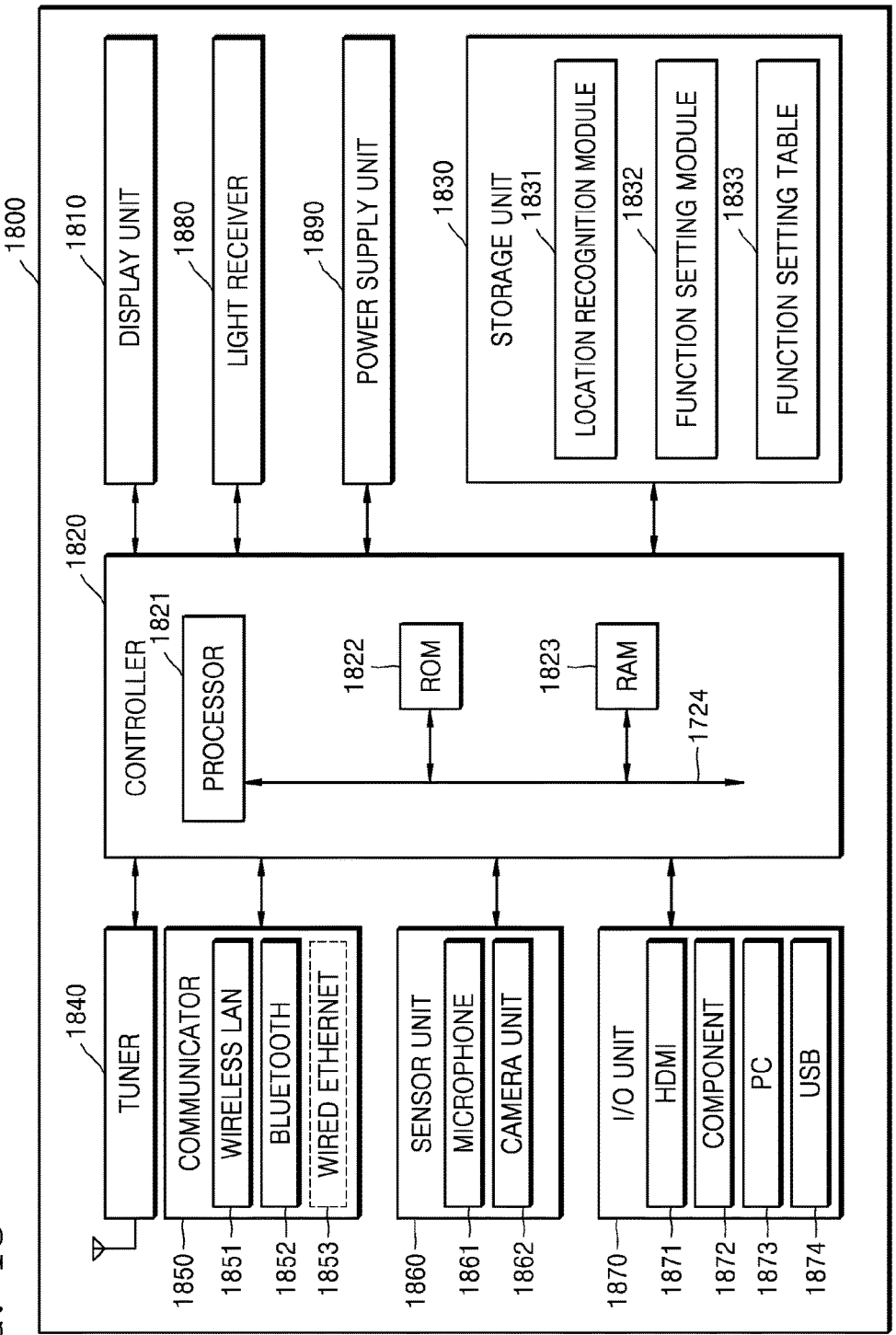
FIG. 18 is a block diagram of a detailed configuration of a display apparatus, according to an exemplary embodiment.

FIG. 18 is a block diagram of a detailed configuration of a display apparatus 1800, according to an exemplary embodiment.

Referring to FIG. 18, the display apparatus 1800 may include a display unit 1810, a controller 1820, a memory 1830, a tuner 1840, a communicator 1850, a sensor unit 1860, an input/output (I/O) unit 1870, a light receiver 1880, and a power supply unit 1890.

The display unit 1810 may display a content included in a broadcast signal received through the tuner 1840 on a screen under control of the controller 1820. The display unit 1810 may also display a content (e.g., a video content or the like) input through the communicator 1850 or the I/O unit

1870. Also, the display unit 1810 may display execution information of an application under control of the controller 1820.

The display unit 1810 may also display a graphic user interface (GUI). The display unit 1810 may include any of a cathode-ray tube (CRT) display, an LED display, a vacuum fluorescent display (VFD), a digital light processing (DLP) display, a flat panel display, a 3D display, a transparent display, or the like.

The controller 1820 controls an overall operation of the display apparatus 1800 and a signal flow between internal elements 1810 through 1890 of the display apparatus 1800 and performs a function of processing data. If there is a user input or a preset and stored condition is satisfied, the controller 1820 may execute an operating system (OS) and various types of applications stored in the memory 1830.

The controller 1820 may include a random-access memory (RAM) 1823 that stores a signal or data input from an external source or is used as a storage area corresponding to various types of jobs performed in the display apparatus 1800, a read-only memory (ROM) 1822 that stores a control program for controlling the display apparatus 1800, and a processor 1821.

The processor 1821 may include a GPU (not shown) for processing a graphic corresponding to a video. The processor 1821 may be realized as a System On Chip (SoC) into which a core (not shown) and a GPU (not shown) are integrated. The processor 1821 may include any of a single core, a dual core, a triple core, a quad core, and a multiple core.

The processor 1821 may also include a plurality of processors. For example, the processor 1821 may be realized as a main processor (not shown) and a sub processor (not shown) operating in a sleep mode.

The RAM 1823, the ROM 1822, and the processor 1821 may be connected to one another through an internal bus 1724.

According to exemplary embodiments, a controller of a display apparatus may be interpreted as the same meaning as the term "processor" and as including the ROM 1822 and the RAM 1823.

The memory 1830 may store various types or data, programs, or applications for driving and controlling the display apparatus 1800 under control of the controller 1820. The memory 1830 may store input/output signals or data corresponding to driving of the display unit 1810, the tuner 1840, the communicator 1850, the sensor unit 1860, the I/O unit 1870, and the power supply unit 1890. The memory 1830 may store a control program for controlling the display apparatus 1800 and the controller 1820, an application initially provided from a manufacturer or downloaded from an external source, a GUI associated with the application, an object (e.g., an image, a text, an icon, a button, or the like) for providing the GUI, user information, a document, databases (DBs), pieces of associated data.

According to an exemplary embodiment, the memory 1830 may include a request list including items of data that each application requests from other applications and a provision list including items of data that each application provides to another application. The memory 1830 may also store data that each application may provide to the other applications.

In an exemplary embodiment, the term "memory" may include the ROM 1822 or the RAM 1823 of a storage unit or a memory card (e.g., a micro secure digital (SD) card, a universal serial bus (USB) memory, or the like (not shown)) installed in the display apparatus 1800. Also, the memory 1830 may include any of a nonvolatile memory, a volatile memory, an HDD, or an SDD.

The tuner 1840 may amplify, mix, resonate, etc. a broadcast signal received by wired or wireless to tune and select merely a frequency of a channel that the display apparatus 1800 is to receive, among radio wave components. The broadcast signal may include audio, video, and additional information (e.g., an Electronic Program Guide (EPG)).

The tuner 1840 may receive the broadcast signal in a frequency band corresponding to any of a channel number (e.g., cable TV channel No. 506) according to a user input (e.g., a control signal received from a remote controller, e.g., a channel number input, an up-down input of a channel, a channel input on an EPG screen, or the like).

The communicator 1850 may include any one selected from a wireless Local Area Network (LAN) 1851, Bluetooth 1852, and wired Ethernet 1853 in response to a performance and a structure of the display apparatus 1800. The communicator 1850 may include a combination of the wireless LAN 1851, the Bluetooth 1852, and the wired Ethernet 1853. The communicator 1850 may receive a control signal of a remote controller under control of the controller 1820. The control signal may be realized as a Bluetooth type, a radio frequency (RF) signal type, or a wireless fidelity (Wi-Fi) type. The communicator 1850 may further include a short-range communication (e.g., a Near Field Communication (NFC) (not shown)) and Bluetooth Low Energy (BLE) (not shown) in addition to the Bluetooth 1852.

The sensor unit 1860 senses a voice, an image, and/or an interaction of a user.

A microphone 1861 receives a voice uttered by the user. The microphone 1861 may convert the received voice into an electrical signal and output the electrical signal to the controller 1820. The voice of the user may, for example, include a voice corresponding to a menu or a function of the display apparatus 1800. A recognition range of the microphone 1861 may be recommended within 4 meters from the microphone 1861 to a location of the user and may vary in response to a tone of the voice of the user and surrounding environments (e.g., a speaker sound, surrounding noise, etc.).

It will be easily understood by those of ordinary skill in the art that the microphone 1861 may be excluded according to a performance and a structure of the display apparatus 1800.

A camera unit 1862 receives an image (e.g., consecutive frames) corresponding to a motion of the user including a gesture in a camera recognition range. For example, a recognition range of the camera unit 1862 may be a distance between 0.1 meters and 5 meters from the camera unit 1862 to the user. The motion of the user may, for example, include a part of a body of the user, such as a face, an expression, a hand, a fist, or the like of the user, a motion of a part of the body of the user, or the like. The camera unit 1862 may convert the received image into an electrical signal and output the electrical signal to the controller 1820 under control of the controller 1820.

The controller 1820 may select a menu displayed on the display apparatus 1800 or may perform a control corresponding to a motion recognition result by using a recognition result of the received motion. For example, the control may include any of a channel control, a volume control, or an indicator movement.

The camera unit 1862 may include a lens (not shown) and an image sensor (not shown). The camera unit 1862 may support an optical zoom or a digital zoom by using a plurality of lenses and image processing. The recognition range of the camera unit 1862 may be variably set according to an angle of a camera and a surrounding environment condition. If the camera unit 1862 includes a plurality of cameras, the camera unit 1862 may receive a 3-dimensional (3D) still image or a 3D motion by using the plurality of cameras.

It will be easily understood by those of ordinary skill in the art that the camera unit 1862 may be excluded according to a performance and a structure of the display apparatus 1800.

The I/O unit 1870 receives video (e.g., a moving image or the like), audio (e.g., a voice, music, or the like), and additional information (e.g., an EPG or the like) from an outside of the display apparatus 1800 under control of the controller 1820. The I/O unit 1870 may include any one selected from a High-Definition Multimedia Interface (HDMI) port 1871, a component jack 1872, a PC port 183, and a USB port 1874. The I/O unit 1870 may include a combination of the HDMI port 1871, the component jack 1872, the PC port 1873, and the USB port 1874.

It will be easily understood by those of ordinary skill in the art that a structure and an operation of the I/O unit 1870 may be variously realized according to exemplary embodiments.

The light receiver 1880 receives a light signal (including a control signal) from an external control device through a light window (not shown) of a bezel of the display unit 1810. The light receiver 1880 may receive a light signal corresponding to a user input (e.g., a touch, a press, a touch gesture, a voice, or a motion) from a control device. A control signal may be extracted from the received light signal under control of the controller 1820.

The power supply unit 1890 supplies the internal elements 1810 through 1880 of the display apparatus 1800 with power input from an external power source under control of the controller 1820. The power supply unit 1890 may also supply the internal elements 1810 through 1880 with power output from one battery or two or more batteries (not shown) located in the display apparatus 1800 under control of the controller 1820.

At least one selected from the internal elements 1810 through 1890 of the display apparatus 1800 of FIG. 18 may be added or deleted according to a performance of the display apparatus 1800. Also, it will be easily understood by those of ordinary skill in the art that locations of the internal elements 1810 through 1890 may be changed according to a performance or a structure of the display apparatus 1800.

Figure 19:
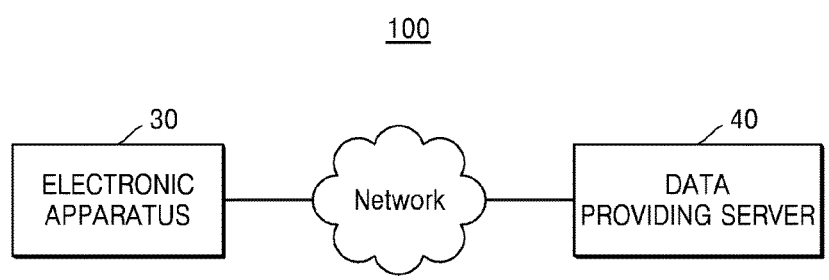
FIG. 19 is a block diagram of an application execution system, according to an exemplary embodiment.

FIG. 19 is a block diagram of an application execution system 100, according to an exemplary embodiment.

Referring to FIG. 19, the application execution system 100 may include an electronic apparatus 30 and a data providing server 40.

According to an exemplary embodiment, the electronic apparatus 30 may be the display apparatus 10 that may receive a broadcast signal. Alternatively, the electronic apparatus 30 may be any of a set-top box, an IP set-top box, or the like connected to the display apparatus 10.

Also, according to an exemplary embodiment, the electronic apparatus 30 may install and execute an application. The application may be an application program executed in the electronic apparatus 30, such as, for example, any of a viewing history management application, a content recommendation application, a calendar application, a voice recognition application, a music player, or the like.

The data providing server 40 may communicate with the electronic apparatus 30 through a network. The data providing server 40 may also store and/or manage data that applications installed in the electronic apparatus 30 respectively request from other applications and data that may be provided to the other applications. For example, the data providing server 40 may generate and/or update a provision list including items of data that a particular application provides to other applications and a request list including items of data that the particular application requests from the other applications. The data providing server 40 may also receive the data provided from the particular application to the other applications from the electronic apparatus 30 and store the data.

Figure 20:
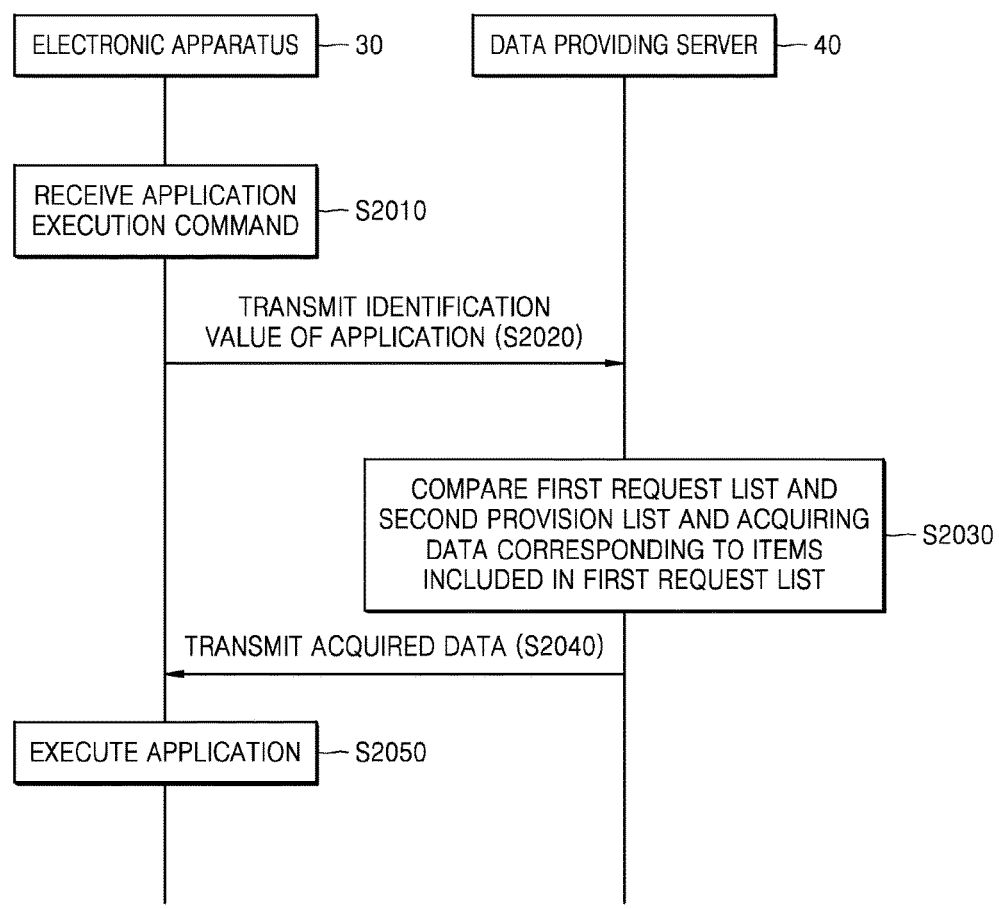
FIG. 20 is a flowchart of a method for operating an application execution system, according to an exemplary embodiment.

FIG. 20 is a flowchart of a method for operating an application execution system, according to an exemplary embodiment.

Referring to FIG. 20, in operation S2010, the electronic apparatus 30 may receive a command for executing application. For example, the electronic apparatus 30 may receive a user command for executing an application from a user. Alternatively, the electronic apparatus 30 may receive a command for executing an application from an external application.

In operation S2020, the electronic apparatus 30 may transmit an identification value of the application to the data providing server 40. For example, the identification value of the application may include at least one selected from a letter, a number, and a symbol of the application.

In operation S2030, the data providing server 40 may acquire a first request list including items of data that the application requests from the other applications and a second provision list including items of data provided from the other applications, based on the identification value of the application. The data providing server 40 may also compare the first request list and the second provision list. Exemplary embodiments illustrated in FIGS. 3A and 3B may be applied as a method of comparing the first request list and the second provision list by using the data providing server 40. Here, the second provision list may include address information corresponding to providable data of applications stored in the data providing server 40.

The data providing sever 40 may also acquire data corresponding to the items included in the first request list, based on the comparison result.

In operation S2040, the data providing server 40 may transmit the acquired to the electronic apparatus 30. In operation S2050, the electronic apparatus 30 may execute the application based on the acquired data.

Figure 21:
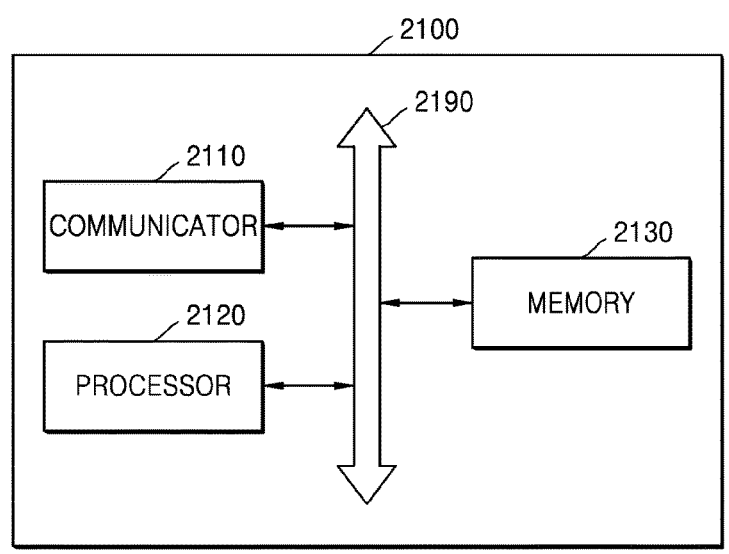
FIG. 21 is a block diagram of a configuration of a data providing server, according to an exemplary embodiment.

FIG. 21 is a block diagram of a configuration of a data providing server 2100, according to an exemplary embodiment.

Referring to FIG. 21, according to an exemplary embodiment, the data providing server 2100 includes a communicator 2110, a processor 2120, and a memory 2130. Several elements included in the data providing server 2100 may be connected to one another through a bus 2190.

According to an exemplary embodiment, the communicator 2110 may receive an identification value of an application from the electronic apparatus 30.

According to an exemplary embodiment, the processor 1620 may compare a first request list including items of data that the application requests from other applications and a second provision list including items of data provided from the other applications based on the identification value of the application. The processor 1620 may also acquire data corresponding to the items included in the first request list based on the comparison result. The processor 1620 may transmit the acquired data to the electronic apparatus 30 through the communicator 1610.

When applications are installed in the electronic apparatus 30, the first request list and a second request list may be received from the electronic apparatus 30.

According to an exemplary embodiment, the memory 1630 may store a request list including items of data that each of applications received from the electronic apparatus 30 requests from other applications and a provision list including items of data provided from the other applications. The memory 1630 may receive and store data that each of the applications received from the electronic apparatus 30 provides to the other applications. Here, a location of the acquired data stored in the memory 1630 may be preset on the provision list.

The above-described exemplary embodiments may be written as a program that may be executed in a computer and may be realized as a general-purpose digital computer that operates the program by using a non-transitory computer readable recording medium.

Examples of the non-transitory computer readable recording medium includes a magnetic medium (e.g., an ROM, a floppy disk, a hard disk, or the like), an optical recording medium (e.g., a CD-ROM, a DVD, or the like), and a storage medium such as carrier waves (e.g., a transmission through the Internet).

While one or more exemplary embodiments have been described with reference to the figures, it will be understood by those of ordinary skill in the art that various changes in form and details may be made therein without departing from the spirit and scope as defined by the following claims.

What is claimed is:

1. A method for executing a plurality of applications including a first application and a second application by using an electronic apparatus, the method comprising:
receiving a user command for executing the first application;
obtaining a first request list which includes first request data items which are used for executing the first application;
obtaining a plurality of provision lists, each of the plurality of provision lists corresponding to each of the plurality of applications, and a respective provision list including provision data items comprising results or intermediate results obtained by executing a respective application;
comparing the first request data items in the first request list with the provision data items in the plurality of provision lists;
identifying, from the plurality of provision lists, a second provision list including second provision data items corresponding to the first request data items included in the first request list based on a result of the comparing;
storing a first provision list, from the plurality of provision lists, which includes first provision data items that the first application provides to one or more other applications, wherein data that corresponds to each of the first provision data items included in the first provision list is generated when executing the first application, and the first provision list includes address information which indicates where the data that corresponds to each of the first provision data items included the first provision list is stored; and
executing the first application based on the second provision data items.

2. The method of claim 1, further comprising:
storing the first request list at a time when the first application is installed.

3. The method of claim 1, wherein the first request data items included in the first request list and the first provision data items included in the first provision list are preset by a developer or a provider of the first application.

4. The method of claim 1, wherein the data generated when executing the first application is processed in a preset format.

5. The method of claim 1, wherein each of the first provision data items included in the first provision list stores authorization information with respect to access by one or more other applications.

6. The method of claim 5, further comprising accessing the data that corresponds to each of the first request data items included in the first request list based on the stored authorization information according to the second provision data items included in the second provision list.

7. The method of claim 1, wherein when the first application is a content recommendation application, the first request list includes at least one of viewing history analysis information and viewing channel analysis information, and the first provision list includes a recommended content list.

8. The method of claim 1, wherein when the first application is a voice recognition application, the first request list includes at least one of web information, weather information, viewing history analysis information, and viewing channel analysis information, and the first provision list includes at least one of a search word and an associated search word.

9. The method of claim 1, wherein when the first application is a viewing history management application, the first request list includes schedule information, and the first provision list includes at least one of viewing history analysis information, viewing channel analysis information, and viewing genre analysis information, and
wherein the viewing history analysis information includes at least one of content name, a number of viewings of a user, a cumulative viewing time, and content information.

10. The method of claim 1, further comprising generating a mapping table in which includes mapping information between the first provision data items that the first application provides to the one or more other applications and the address information.

11. An electronic apparatus comprising:
a memory configured to store a plurality of applications including a first application and a second application; and
a processor configured to
receive a user command for executing the first application,
obtain a first request list which includes first request data items which are used for executing the first application
obtain a plurality of provision lists, each of the plurality of provision lists corresponding to each of the plurality of applications, and a respective provision list including provision data items comprising results or intermediate results obtained by executing a respective application,
compare the first request data items in the first request list with the provision data items in the plurality of provision lists,
identifying, from the plurality of provision lists, a second provision list including
second provision data items corresponding to the first request data items included in the first request list based on a result of a comparison, and execute the first application based on the second provision data items,
wherein the memory is further configured to store a first provision list, from the plurality of provision lists, which includes first provision data items that the first application provides to at least one additional application, and wherein data that corresponds to each of the first provision data items included in the first provision list is generated when the first application is executing, and the memory is further configured to store address information in which the data that corresponds to each of the first provision data items included in the first provision list is stored.

12. The electronic apparatus of claim 11, wherein the processor is further configured to store the first request list in the memory at a time when the first application is installed.

13. The electronic apparatus of claim 11, wherein the first request data items included in the first request list and the first provision data items included the first provision list are preset by a developer or a provider of the first application.

14. The electronic apparatus of claim 11, wherein the processor is further configured to process the data generated when the first application is executing, in a preset format.

15. The electronic apparatus of claim 11, wherein the processor is further configured to allocate authorization information, with respect to access by the at least one additional application, to the data that corresponds to each of the first provision data items included in the first provision list.

16. The electronic apparatus of claim 15, wherein the processor is further configured to acquire data that corresponds to each of the first request data items included in the first request list based on the allocated authorization information according to the second provision data items included in the second provision list.

17. The electronic apparatus of claim 11, wherein the processor is further configured to generate a mapping table in which includes mapping information between the first provision data items that the first application provides to the at least one additional application and the address information.

18. A non-transitory computer readable recording medium having recorded thereon a program for performing a method for executing a plurality of applications including a first application and a second application by an electronic apparatus, the method comprising:
receiving a user command for executing the first application;
obtaining a first request list which includes first request data items which are used for executing the first application;
obtaining a plurality of provision lists, each of the plurality of provision lists corresponding to each of the plurality of applications, and a respective provision list including provision data items comprising results or intermediate results obtained by executing a respective application;
comparing the first request data items in the first request list with the provision data items in the plurality of provision lists;
identifying, from the plurality of provision lists, a second provision list including second provision data items corresponding to the first request data items included in the first request list based on a result of the comparing;
storing a first provision list, from the plurality of provision lists, which includes first provision data items that the first application provides to one or more other applications, wherein data that corresponds to each of the first provision data items included in the first provision list is generated when executing the first application, and the first provision list includes address information which indicates where the data that corresponds to each of the first provision data items included the first provision list is stored; and
executing the first application based on the second provision data items.

19. The non-transitory computer readable recording medium of claim 18, wherein the method further comprises generating a mapping table in which includes mapping information between the first provision data items that the first application provides to the one or more other applications and the address information.

* * * * *